UNITED STATES PATENT OFFICE.

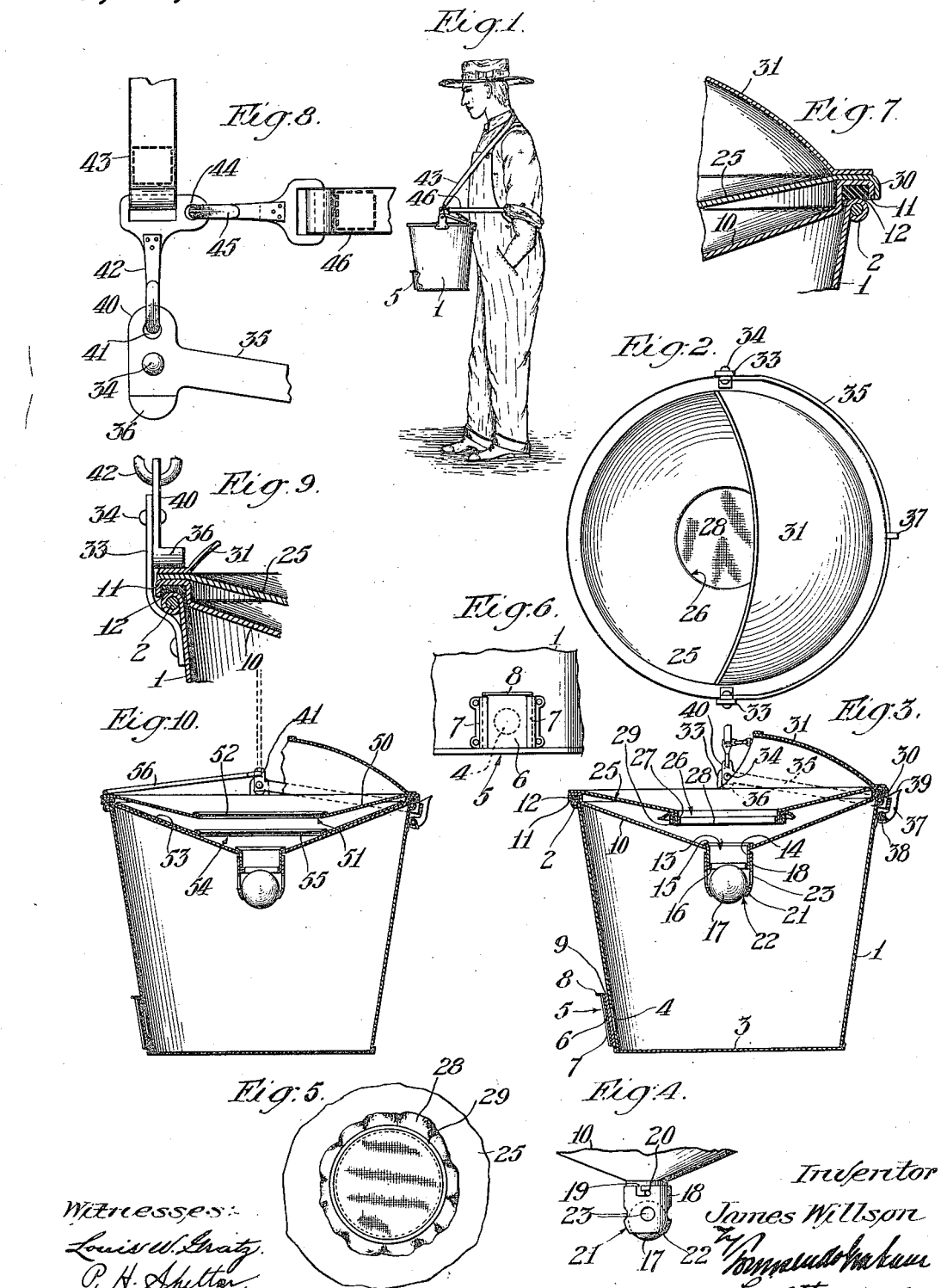

JAMES WILLSON, OF PORTERSVILLE, CALIFORNIA.

MILKING-PAIL.

1,145,176.   Specification of Letters Patent.   Patented July 6, 1915.

Application filed November 26, 1913.   Serial No. 803,345.

*To all whom it may concern:*

Be it known that I, JAMES WILLSON, a citizen of the United States, residing at Portersville, in the county of Tulare and State of California, have invented a new and useful Milking-Pail, of which the following is a specification.

In the operation of milking cows it is customary to hold the milking pail between the knees of the milker while in a stooping position, sometimes the milker using a stool. Frequently cows during the milking operation move about and at times kick either the milker or the pail resulting in upsetting the pail and loss of milk, and the main objects of my invention are to provide a milking pail which will not spill the contents thereof when overturned and also to provide means whereby the pail may be supported from the body of the milker thereby permitting the milker to have free use of his hands at all times during the milking operation and particularly in the event that the cow should be restless or kick.

My invention primarily consists of a milking pail having a lid or cover through which the milk may freely pass into the pail and means whereby the milk is prevented from spilling from the pail.

My invention further consists in a milking pail having a lid or cover through which the milk may freely pass into the pail and during such passage be strained, valve means in the cover for preventing the milk from spilling from the pail, and a separate outlet means for the contents of the pail.

My invention further consists in providing a milking pail from which the milk will not spill, and means for supporting such pail on the body of the milker.

Referring to the drawings which are for illustrative purposes only: Figure 1 is a view of a milker showing the manner of supporting the milking pail. Fig. 2 is a plan view of a pail embodying a form of my invention. Fig. 3 is a vertical sectional view of the pail shown in Fig. 2. Fig. 4 is a fragmentary side elevation of the valve means. Fig. 5 is a fragmentary inverted plan view of one of the straining members. Fig. 6 is a side elevation of the outlet means. Fig. 7 is an enlarged sectional view of the top of the pail and adjacent parts. Fig. 8 is an enlarged side elevation of the fastening means for securing the supporting means to the pail. Fig. 9 is an enlarged view, partly in section, showing the lid clamping means. Fig. 10 is a sectional view of a modified form of my invention.

1 designates a pail or bucket, the upper edge of which terminates in a roll 2. Formed in the side of the pail adjacent to the bottom 3 thereof is an outlet opening 4 provided with a gate or closure 5 on the outer side thereof, which gate 5 is formed of a sheet metal plate 6 mounted to move vertically in guides 7 and having an outwardly turned flange 8 at the top thereof to provide handle means for raising or lowering the gate. For the purpose of providing a tight closure the inner face of the plate 6 is provided with a leather strip 9 secured to the plate 6 in any suitable manner.

10 designates a circular lid or cover provided at its outer edge with a circular groove 11 adapted to receive a gasket 12 of rubber or similar material which rests upon the roll 2 of the pail 1. The lid 10 is dished downwardly and is provided with a central opening 13 in which is secured a tubular shell or extension 14 forming one member of a valve body. The upper end of the shell 14 is provided with an outwardly extending circular flange 15 which extends over the edge of the opening 13 being secured thereto by means of solder or in any suitable manner. The lower end of the shell 14 is provided with an inwardly extending circular flange 16 which forms a valve seat for the valve member 17, which in the present instance is a glass ball retained in the valve body by means of a tubular telescoping member 18, the upper end of which is provided with a plurality of bayonet slots 19 adapted to receive pins 20 on the shell 14. The tubular member 18 is rounded inwardly at the lower end thereof as indicated at 21 and is provided with a central opening 22 adapted to partially receive the ball 17 when the pail is in an upright position as shown in Fig. 3.

23 designates a series of openings in the side of the tubular member 18 for the purpose of discharging the milk, as hereinafter described, into the pail.

25 designates a strainer member, preferably formed of sheet metal, circular in form, and arranged to rest upon the edge of the lid 10. The strainer member 25 is dished downwardly and is provided with a central opening 26 surrounded by a downwardly extending flange 27, over which flange 27 is placed a cloth 28, or other suitable straining material, the cloth 28 being secured on the flange 27 by means of a circular ring 29 which fits over the cloth about the flange 27. The strainer member 25 is also provided with a downwardly extending flange 30 at one side thereof which extends over the edge of the lid 10 to prevent dislodgment of the strainer member 25 from the lid 10 during the operation of clamping the lid to the pail as hereinafter described.

31 designates a shield or partial cover for the strainer member 25, the shield 31 being formed of sheet metal and extending substantially half way over the strainer member 25, the outer edges of the shield 31 being soldered or secured to the strainer member 25 in any suitable manner.

33, 33 designate bail ears secured to the opposite sides of the pail, each adapted to receive a headed pin 34 upon which is pivotally mounted a clamping bail 35. The clamping bail is provided with a cam head 36 adapted to engage the upper face of the strainer member 25 and to press the same tightly down on the edge of the lid 10, the gasket 12 of which is pressed against the rolled edge 2 of the bucket, thereby forming a tight closure between the lid 10 and the bucket.

The head 36 is so arranged on the bail 35 that when the pail is in a vertical position the head 36 is free of the strainer member 25 but when the clamping bail is pressed downwardly in the position shown in Fig. 3 the head 36 accomplishes the clamping action just described. Means are provided for retaining the clamping bail in clamped position which consists of a spring latch 37 pivoted at 38 to the side of the bucket and provided with a head 39 which engages over the clamping bail 35. The clamping bail 35 is also provided with a lug 40 having an eye 41 to which is attached a snap hook 42 of a band 43, the band 43 being of sufficient length to fit over the shoulders of the party using the pail, there being a snap hook 42 at each end of the band 43 which engage the eyes 41 in the respective lugs 40 at each end of the bail 35. On each snap hook 42 is an eye 44 to which may be attached, if it is desired, a snap hook 45 secured to a belt 46 arranged to extend around the waist of the milker, which belt 46 is designed to prevent lateral motion of the pail when the same is supported by means of the band 43 from the shoulders of the milker.

In the form shown in Fig. 10 the pail, the outlet means therefor, the lid, and the valve means thereon are all substantially the same form and construction as heretofore described in relation to Figs. 1 to 9, inclusive. A strainer member 50 is provided, however, in which a circular opening 51 is provided in the central portion thereof, which opening 51 is covered by means of a wire screen 52 soldered to the upper face of the strainer member 50. In the form of my invention shown in Fig. 10 the strainer member 50 extends over the edge of the lid 10 and is clamped by means of a clamping bail in the same manner as that heretofore described with relation to the preceding figures. As an additional precaution, however, I have shown an additional strainer member consisting of a circular plate 53, the shape of which conforms to the upper face of the lid 10 upon which the strainer member 53 is adapted to lie. The strainer member 53 is provided with a central opening 54 covered by a wire screen 55 of closer mesh than the screen 52 in the upper strainer member, the screen 55 being secured to the strainer member 53 by solder or any other suitable means. In this form of my invention I have shown a wire bail 56 secured to the lug 40 of the clamping bail 35 by extending the ends of the bail through the perforations 41 therein, in the well known manner, in which case the pail may be carried by means of the bail 56 instead of the shoulder supporting means heretofore described in relation to the preceding figures.

The milking pail is used in the following manner: The pail as shown in Figs. 1 to 9, inclusive, is supported in front of the milker by means of the band 43 which passes over the shoulders of the wearer and by means of the belt 46. The pail is so arranged that the shield 31 is next to the body of the milker, and the outlet means 5 is at the front of the pail away from the milker. The milk is delivered from the cow against the strainer member 25 and passes through the cloth 28 on to the lid 10. The milk then discharges from the lid 10 into the valve body formed thereon through the opening 13. From the valve body the milk passes through the openings 23 into the pail. It will readily be seen that as long as the pail is held in the position shown in Figs. 1 and 3, or in a position approximately the same as that shown, that the ball 17 will remain in the lower end of the tubular member 18, but in the event that the pail should be upset the ball 17 will be forced by the milk in the pail against the valve seat 16, and passage of milk from the interior of the pail at the same time will be prevented. The milk is prevented from splashing on the person performing the milking operation by means of the shield 31.

When it is desired to discharge the contents of the pail the same may be done by opening the outlet valve 5, thereby freeing the opening 4 in the pail and permitting the discharge of the milk from the pail, which operation may be accomplished without removing the pail from the supporting means heretofore described.

It is to be noted and understood that the strainer member 25 and the lid 10 may be readily removed from the top of the pail, when it is desired to sterilize the parts of the pail, by releasing the latch 37 and moving the clamping bail into a vertical position. After the lid 10 has been removed from the pail the valve may be thoroughly cleaned and sterilized by removing the tubular member 18 from the extension 14.

In the form shown in Fig. 10 the milking operation is performed in the same general way with the exception that the pail must be held between the legs of the milker, as is done with the ordinary pail, and in this form as heretofore noted an additional means is provided for preventing dirt or other foreign material from entering the pail which consists of the secondary strainer member 53.

I claim as my invention:

1. In combination, a milking pail, a lid for said pail, valve means in said lid for controlling the passage of milk therethrough, a strainer member seated on said lid, a shield secured to said strainer member and extending partially thereover, and means for clamping said strainer member and said lid to the pail.

2. In combination, a milking pail, a lid therefor, a gasket in said lid adapted to engage the top of said pail, check valve means in said lid to prevent the contents of said pail from spilling therefrom, a circular plate on said lid having a central opening therein, a circular flange extending downwardly from said opening, a strainer cloth stretched over said flange across the opening therethrough, means for securing said cloth thereto, clamping means on said pail adapted to engage the upper face of said plate to clamp said plate and said lid to the top of said pail, discharge means for said pail, and means on said pail for attaching supporting means thereto.

3. In combination, a milking pail, a downwardly dished lid therefor, a gasket in said lid adapted to engage the top of said pail, an upper strainer member resting on the edge of said lid, a shield extending partially over said upper member, a lower strainer member between said lid and said upper strainer member, check valve means in said lid for preventing the contents of said pail from spilling therefrom, separate discharge means for said pail, and clamping means on said pail whereby said upper strainer member and said lid are clamped to the top of said pail.

In testimony whereof, I have hereunto set my hand at Los Angeles, California, this 15th day of November, 1913.

JAMES WILLSON.

In presence of—
  Frank L. A. Graham,
  P. H. Shelton.